(12) United States Patent
Chen

(10) Patent No.: US 8,607,079 B2
(45) Date of Patent: Dec. 10, 2013

(54) POWER-ON TEST SYSTEM FOR TESTING STORAGE DEVICE AND TEST METHOD EMPLOYING THE SAME

(75) Inventor: Tzu-Chien Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 13/155,320

(22) Filed: Jun. 7, 2011

(65) Prior Publication Data

US 2012/0266006 A1 Oct. 18, 2012

(30) Foreign Application Priority Data

Apr. 13, 2011 (TW) .............................. 100112765 A

(51) Int. Cl.
G06F 1/26 (2006.01)
(52) U.S. Cl.
USPC .......................................... 713/300; 713/310

(58) Field of Classification Search
None
See application file for complete search history.

(56) References Cited

U.S. PATENT DOCUMENTS

| | | | | |
|---|---|---|---|---|
| 2002/0157053 | A1* | 10/2002 | Chen et al. | 714/744 |
| 2005/0108491 | A1* | 5/2005 | Wong et al. | 711/167 |
| 2008/0164883 | A1* | 7/2008 | Chen et al. | 324/511 |
| 2012/0136838 | A1* | 5/2012 | Moyer | 707/690 |

* cited by examiner

*Primary Examiner* — Paul Yanchus, III
(74) *Attorney, Agent, or Firm* — Altis Law Group, Inc.

(57) ABSTRACT

A power-on test system for testing a storage device, the power-on test system includes a computer, a signal microcontroller, a switch unit, and a power source. The computer includes a counter capable of recording the number of power-on times of the storage device. The computer prompts the signal microcontroller to turn on or off the switch unit according to a preset frequency, the power source electrically connects to or disconnects from the storage device through the switch unit, the storage device outputs corresponding power-on status signals and power-off status signals to the computer, and the counter increases by one after each power-on testing.

14 Claims, 3 Drawing Sheets

POWER-ON TEST SYSTEM FOR TESTING STORAGE DEVICE AND TEST METHOD EMPLOYING THE SAME

BACKGROUND

1. Technical Field

The disclosure generally relates to test devices, and more particularly to a power-on test system for testing a storage device and a test method employing the same.

2. Description of the Related Art

Storage devices, such as disks, redundant arrays of inexpensive disks (RAID), need repeated power-on tests during predetermined power-on times of the storage devices, to meet performance requirements. A power-on test system often includes a computer, a storage device, and a power source for powering the storage device, the computer being electrically connected to the storage device. The power source alternately connects with or disconnects from the storage device, thereby the storage device is powered on or off according to a predetermined frequency. The computer receives power-on signals from the storage device and records the total number of power-on signals from the storage device.

However, during testing, both the computer and the storage device independently record the number of times the device is powered-on. Thus, the number of times powered-on recorded by the computer may be inconsistent with the number of times powered-on recorded by the storage device due to transmission delays and counting errors, resulting in inaccurate test results.

Therefore, there is room for improvement within the art.

BRIEF DESCRIPTION OF THE DRAWINGS

Many aspects of a power-on test system for testing storage device and test method employing the same can be better understood with reference to the following drawings. The components in the drawings are not necessarily drawn to scale, the emphasis instead being placed upon clearly illustrating the principles of the power-on test system for testing storage device and test method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
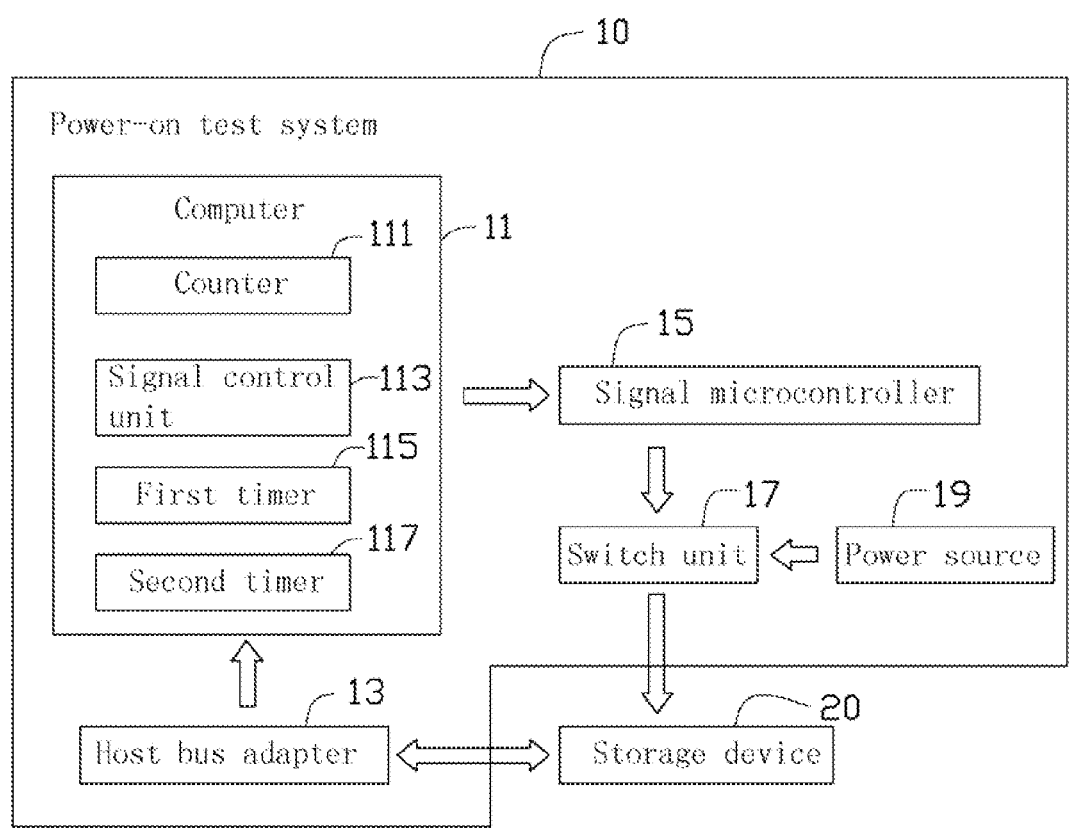
FIG. 1 is a block diagram of a power-on test system for executing a power-on testing of a storage device, according to one embodiment of the disclosure.

FIG. 1 shows a block diagram of a power-on test system 10 for executing a power-on testing of a storage device 20, according to one embodiment of the disclosure. In this embodiment, the storage device 20 can be a redundant array of independent disks (RAID), which provides increased data storage and reliability through redundancy.

The power-on test system 10 includes a computer 11, a host bus adapter (HBA) 13, a signal microcontroller 15, a switch unit 17, and a power source 19. In this embodiment, the switch unit 17 is in electronic communication with the signal microcontroller 15, the power source 19 and the storage device 20. The computer 11 is in electronic communication with the HBA 13 and the signal microcontroller 15. The HBA 13 is in electronic communication with the storage device 20. The switch unit 17 can be a relay.

The computer 11, as the host system, carries out a sequence of arithmetical or logical operations. The HBA 13 can electrically connect the computer 11 and the storage device 20 to provide input/output processing and physical connection. In this embodiment, the computer 11 enables and drives the signal microcontroller 15 to generate and output a command signal that turns the switch unit 17 on or off. The computer 11 can also detect status information including the powered-on status and the powered-off status in the storage device 20.

For example, when the signal microcontroller 15 outputs a power-on command signal to the switch unit 17 to switch on, then the power source 19 is electrically connected to the storage device 20 through the switch unit 17, the storage device 20 transmits a power-on status signal to the computer 11 through the HBA 13. When the signal microcontroller 15 outputs a power-off command signal to the switch unit 17 to switch off, the power source 19 is disconnected from the storage device 20, which transmits a power-off status signal to the computer 11 through the HBA 13.

The computer 11 includes a counter 111, a signal control unit 113, a first timer 115, and a second timer 117. The counter 111 is capable of storing and displaying the number of power-on events in the storage device 20. In this embodiment, when the storage device 20 finishes a power-on testing, the counter 111 then increases by one (increments). When the counter 111 reaches a predetermined number of power-on events, the power-on test system 10 then finishes the power-on testing of the storage device 20.

The signal control unit 113 receives the power-on status signals and the power-off status signals from the storage device 20 through the HBA 13, and this data is conveyed to the signal microcontroller 15. The signal control unit 113 further determines whether the count in counter 111 comes up to the predetermined number, when the count in the counter 111 equals or exceeds the predetermined number of times powered-on, the signal control unit 113 stops transmitting a command signal to the signal microcontroller 15.

In this embodiment, the first timer 115 can be a power-on timer, and the second timer 117 can be a power-off timer. The first timer 115 and the second timer 117 are respectively capable of measuring the power-on time and the power-off time of the storage device 20. The signal control unit 113 is in electronic communication with the signal microcontroller 15 through an RS-232 cable. The HBA 13 is mounted on the motherboard of the computer 11 to exchange data with the computer 11.

Figure 2A:
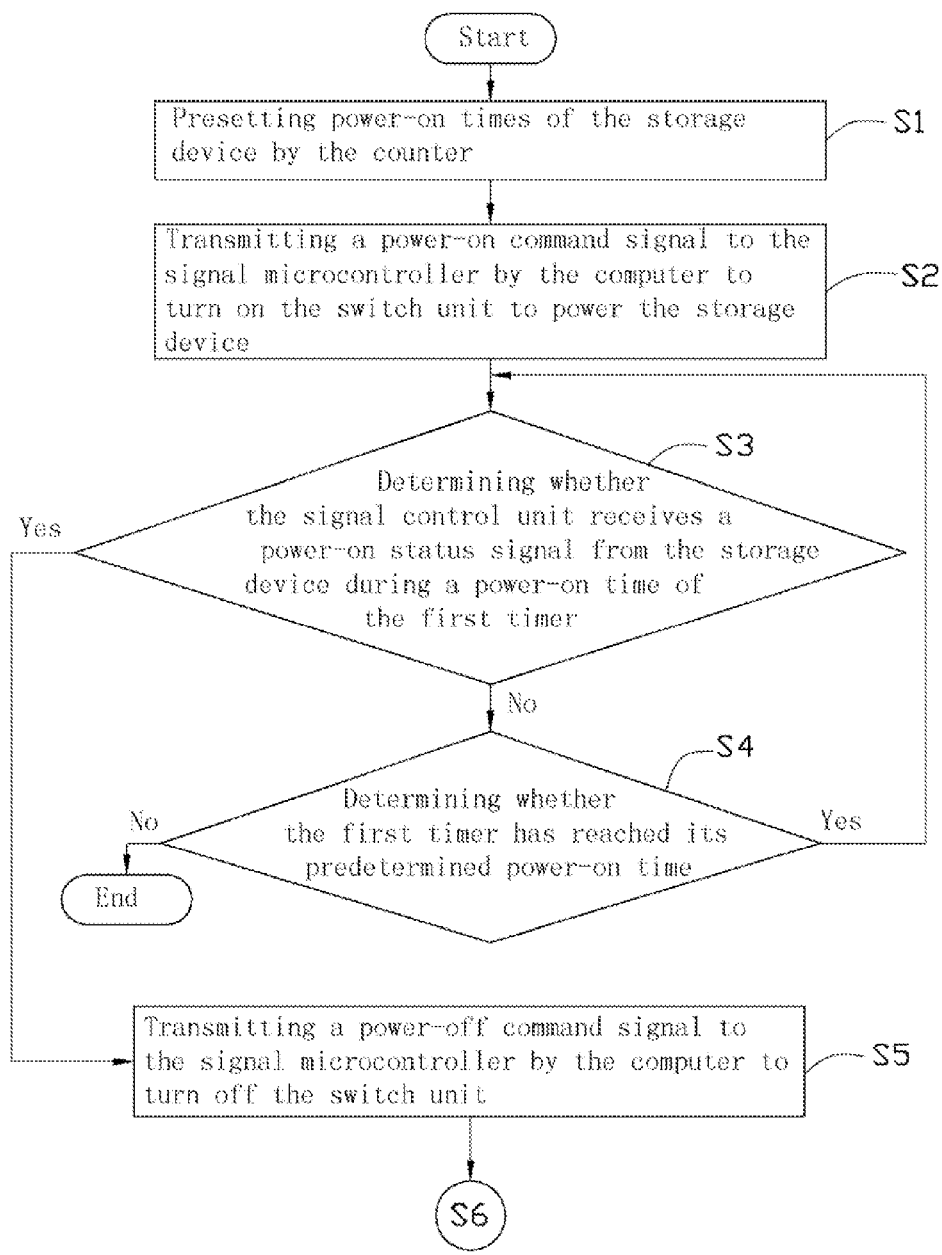
FIGS. 2A-2B are flowcharts illustrating a method for testing the storage device, according to one embodiment of the disclosure.
Figure 2B:
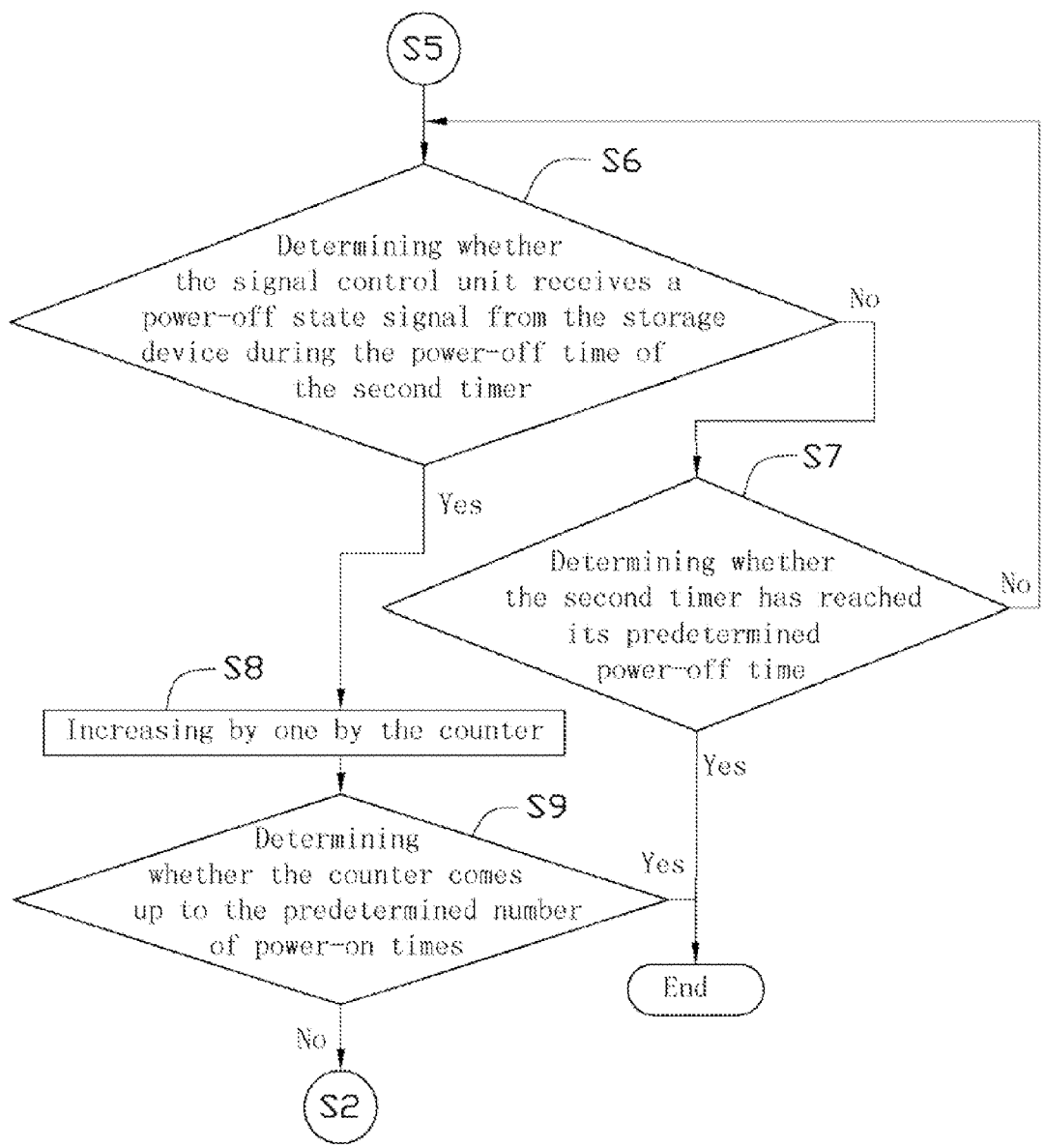

Also referring to FIGS. 2A and 2B, a method for executing a power-on testing of the storage device 20 according to an embodiment of the disclosure is depicted. The method can use the aforementioned power-on test system 10 to measure and record the number of times powered-on and powered-off of the storage device 20, and includes at least the following steps.

In step S1, the power-on times of the storage device 20 is predetermined by setting the counter 111, the power-on time of the storage device 20 is predetermined by setting the first timer 115, the power-off time of the storage device 20 is predetermined by setting the second timer 117.

In step S2, the signal control unit 113 transmits a power-on command signal to the signal microcontroller 15, the switch unit 17 is turned on according to the power-on command signal, and the power source 19 connects and powers the storage device 20 and the first timer 115 starts to time. For example, when the storage device 20 is first powered on, the computer 11 displays received operating parameters from the storage device 20.

In step S3, the signal control unit 113 determines whether a power-on status signal is received from the storage device 20 during the power-on time of the first timer 115. If the signal control unit 113 receives the power-on status signal from the storage device 20 during the power-on time, then the method proceeds to step S5; if the signal control unit 113 does not receive the power-on status signal from the storage device 20 during the power-on time, then the method proceeds to step S4.

In step S4, the signal control unit 113 determines whether the first timer 115 has reached its predetermined power-on time. If the first timer 115 equals or exceeds the predetermined power-on time, then the computer 11 displays an error message and the method proceeds to the end; if the first timer 115 is under the predetermined power-on time, then step S3 is repeated.

In step S5, the signal control unit 113 transmits a power-off command signal to the signal microcontroller 15 to turn off the switch unit 17 according to the power-off command signal, so the power source 19 stops powering the storage device 20, and the second timer 117 starts to time. In this embodiment, when the storage device 20 is powered off, the counter 111 increases by one.

In step S6, the signal control unit 113 determines whether a power-off status signal has been received from the storage device 20 during the power-off time of the second timer 117. If the signal control unit 113 receives the power-off status signal from the storage device 20 during the power-off time, then the method proceeds to step S8; if the signal control unit 113 fails to receive the power-off status signal from the storage device 20 during the power-off time, then the method proceeds to step S7.

In step S7, the signal control unit 113 determines whether the second timer 117 has reached its predetermined power-off time. If the second timer 117 equals or exceeds the predetermined power-off time, the computer 11 outputs a message, and the method proceeds to end; if the second timer 117 is under the predetermined power-off time, then step S6 is repeated.

In step S8, the counter 111 increases by one.

In step S9, the signal control unit 113 determines whether the counter 111 comes up to the predetermined number of power-on times. If the counter 111 equals or exceeds the number of power-on times, then the method proceeds to end; if the counter 111 is under the power-on times, then step S2 is repeated.

In the power-on test system 10 for the storage device 20 of the disclosure, the computer 11 controls the signal control unit 15 to generate corresponding power-on and power-off command signals, and the switch unit 17 is switched on/off according to the command signals. Hence, the power source 19 is electrically disconnected from or connected to the storage device 20. Thus, the computer 11 itself controls and records the power-on times of the storage device 20, which can provide more accurate test results.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer capable of testing a storage device, the computer electrically connected to a signal microcontroller, and electrically connected to a switch unit through the signal microcontroller, wherein the switch unit is electrically connected to the storage device, the computer comprising:
    a signal control unit connecting a power source to or disconnecting the power source from the storage device through the switch unit;
    a counter recording the number of power-on times of the storage device;
    a first timer capable of measuring power-on time of the storage device, the signal control unit transmitting a power-on command signal to the signal microcontroller to turn the switch unit on according to the power-on command signal, the power source connecting and powering the storage device through the switch unit, and the first timer starting to time; and
    a second timer, if the signal control unit receives a power-on status signal from the storage device during the power-on time of the first timer, the signal control unit transmitting a power-off command signal to the signal microcontroller to turn the switch unit off according to the power-off command signal, the power source stopping powering the storage device, and the second timer starting to time;
    the counter increasing by one if the signal control unit receives a power-off status signal from the storage device during the power-off time of the second timer;
    wherein the signal microcontroller turns on or off the switch unit according to a preset frequency.

2. The computer as claimed in claim 1, where the computer is electrically connected to the storage device through a host bus adapter (HBA), the HBA provides input/output processing and physical connection for the computer.

3. The computer as claimed in claim 2, wherein when the signal microcontroller outputs the power-on command signal to the switch unit, then the switch unit is turned on, the power source is electrically connected to the storage device through the switch unit, the storage device transmits the power-on status signal to the computer through the HBA, when the signal microcontroller outputs the power-off command signal to the switch unit, then the switch unit is turned off, the power source is disconnected from the storage device, and the storage device transmits the power-off status signal to the computer through the HBA.

4. The computer as claimed in claim 3, wherein the signal control unit receives the power-on status signal and the power-off status signal of the storage device through the HBA and transmits corresponding command signals to the signal microcontroller.

5. The computer as claimed in claim 4, wherein the signal control unit determines whether the counter comes up to the predetermined number of power-on times, when the count in the counter equals or exceeds the predetermined number of times powered-on, the signal control unit stops transmitting the command signal to the signal microcontroller.

6. The computer as claimed in claim 1, wherein if the signal control unit is unable to receive the power-on status signal from the storage device during the power-on time of the first timer, the signal control unit determines whether the first timer has reached its predetermined power-on time.

7. The computer as claimed in claim 1, wherein if the signal control unit fails to receive the power-off status signal from the storage device during the power-off time, the signal control unit determines whether the second timer has reached its predetermined power-off time.

8. A test method for executing a power-on testing of a storage device, the test method comprising:
providing a computer capable of testing the storage device, the computer electrically connected to a signal microcontroller, and electrically connected to a switch unit through the signal microcontroller, the switch unit electrically connected to the storage device, the computer comprising a counter, a signal control unit, a first timer, and a second timer;
presetting power-on times of the storage device by the counter;
transmitting a power-on command signal to the signal microcontroller by the computer to turn the switch unit on to power the storage device;
determining whether the signal control unit receives a power-on status signal from the storage device during a power-on time of the first timer;
transmitting a power-off command signal to the signal microcontroller by the computer to turn the switch unit off if the signal control unit receives the power-on status signal from the storage device during the power-on time of the first timer;
determining whether the signal control unit receives a power-off status signal from the storage device during a power-off time of the second timer; and
increasing by one by the counter if the signal control unit receives the power-off status signal from the storage device during the power-off time of the second timer until the counter comes up to the predetermined number of power-on times.

9. The test method as claimed in claim 8, further comprising determining whether the first timer comes up to the predetermined power-on time if the signal control unit does not receive the power-on status signal from the storage device during the power-on time of the first timer.

10. A computer capable of testing a storage device, the computer electrically connected to a signal microcontroller, and electrically connected to a switch unit through the signal microcontroller, wherein the switch unit is electrically connected to the storage device, the computer comprising:
a signal control unit, the signal control unit enabling the signal microcontroller to generating a command signal and connecting a power source to or disconnecting the power source from the storage device through the switch unit;
a counter recording the number of power-on times of the storage device;
a first timer, the first timer measuring power-on time of the storage device, the signal control unit transmitting a power-on command signal to the signal microcontroller to turn on the switch unit according to the power-on command signal, the power source connecting and powering the storage device through the switch unit, and the first timer starting to time;
a second timer, if the signal control unit receives a power-on status signal from the storage device during a power-on time of the first timer, the signal control unit transmitting a power-off command signal to the signal microcontroller to turn off the switch unit according to the power-off command signal, the power source stopping powering the storage device, and the second timer starting to time;
the counter increasing by one if the signal control unit receives a power-off status signal from the storage device during the power-off time of the second timer;
wherein the signal microcontroller turns on or off the switch unit under the control of the command signal according to a preset frequency.

11. The computer as claimed in claim 10, wherein the signal control unit receives the power-on status signal and the power-off status signal of the storage device, and sends corresponding command signals to the signal microcontroller, the signal control unit determines whether the counter comes up to the predetermined number of power-on times, when the count in the counter equals or exceeds the predetermined number of times powered-on, the signal control unit stops transmitting the command signal to the signal microcontroller.

12. The computer as claimed in claim 10, wherein if the signal control unit is unable to receive the power-on status signal from the storage device during the power-on time of the first timer, the signal control unit determines whether the first timer comes up to the predetermined power-on time of the first timer.

13. The computer as claimed in claim 10, wherein during the power off time of the second timer, the counter increases by one, if the signal control unit fails to receive the power-off status signal from the storage device during the power-off time, the signal control unit determines whether the second timer comes up to the predetermined power-off time of the second timer.

14. The test method as claimed in claim 8, further comprising determining whether the second timer comes up to the predetermined power-off time if the signal control unit does not receive the power-off status signal from the storage device during the power-off time of the second timer.

* * * * *